US 10,886,752 B2

(12) United States Patent
Zhao et al.

(10) Patent No.: US 10,886,752 B2
(45) Date of Patent: Jan. 5, 2021

(54) ADJUSTABLE CABLE VOLTAGE COMPENSATION FOR BATTERY CHARGERS

(71) Applicant: Shanghai SIM-BCD Semiconductor Manufacturing Co., Ltd., Shanghai (CN)

(72) Inventors: Jingjing Zhao, Shanghai (CN); Qinghua Su, Shanghai (CN); Hu Wang, Shanghai (CN)

(73) Assignee: DIODES INCORPORATED, Plano, TX (US)

( * ) Notice: Subject to any disclaimer, the term of this patent is extended or adjusted under 35 U.S.C. 154(b) by 1101 days.

(21) Appl. No.: 14/624,524

(22) Filed: Feb. 17, 2015

(65) Prior Publication Data
US 2016/0241068 A1   Aug. 18, 2016
US 2018/0152036 A9   May 31, 2018

(30) Foreign Application Priority Data

Jan. 24, 2014 (CN) .......................... 2014 1 0035354

(51) Int. Cl.
| *H02J 7/00* | (2006.01) |
| *H02J 7/02* | (2016.01) |
| *H02M 3/335* | (2006.01) |

(52) U.S. Cl.
CPC .............. *H02J 7/00* (2013.01); *H02J 7/0072* (2013.01); *H02J 7/022* (2013.01); *H02M 3/33507* (2013.01); *H02J 2207/20* (2020.01)

(58) Field of Classification Search
None
See application file for complete search history.

(56) References Cited

U.S. PATENT DOCUMENTS

| 2007/0273414 A1* | 11/2007 | Jung ..................... H02M 3/156 327/113 |
| 2008/0111714 A1* | 5/2008 | Kremin .................. G06F 3/044 341/33 |
| 2011/0044076 A1* | 2/2011 | Zhang ............... H02M 3/33507 363/21.17 |

(Continued)

OTHER PUBLICATIONS

Riley, "RL, RC, and RLC Circuits" Mar. 2013.*

*Primary Examiner* — Robert Grant
*Assistant Examiner* — Tynese V McDaniel

(57) ABSTRACT

A battery charger controller is configured to add a compensation current in the feedback control loop such that the output voltage varies with the output current to compensate charging cable voltage drop. In some embodiments, the output voltage is also proportional to a compensation resistor. Therefore, cable voltage drop compensation can be adjusted using a resistor that is external to the controller IC. The external resistor may be one of the feedback resistors connected at a voltage feedback pin. In another embodiment, the adjustable resistor is the resistor between the feedback resistors and the voltage feedback pin. In still another embodiment, the adjustable resistor is the resistor in parallel with a compensation capacitor. In embodiments of the invention, adjusting the resistance of the external compensation resistor can change the voltage drop compensation and allow the power supply to meet requirements of different charging cable applications.

20 Claims, 9 Drawing Sheets

(56) References Cited

U.S. PATENT DOCUMENTS

| | | | |
|---|---|---|---|
| 2011/0164666 A1* | 7/2011 | De Jong | H03D 7/166 375/224 |
| 2012/0075891 A1* | 3/2012 | Zhang | H02M 3/33523 363/21.18 |
| 2015/0023069 A1* | 1/2015 | Zhu | H02M 3/33507 363/21.16 |
| 2015/0194836 A1* | 7/2015 | Teo | H02J 7/0072 320/163 |

* cited by examiner

ADJUSTABLE CABLE VOLTAGE COMPENSATION FOR BATTERY CHARGERS

CROSS-REFERENCES TO RELATED APPLICATIONS

This application claims priority to Chinese Patent Application No. 201410035354.X, filed Jan. 24, 2014, commonly owned and incorporated by reference herein.

BACKGROUND OF THE INVENTION

The present invention relates generally to the field of switch mode power supply (SMPS). More particularly, embodiments of the present invention relate to SMPS used as battery chargers that can be adapted to compensate for voltage drops from different charging cables.

Switching power supply products have been widely used because of their small size, light weight, and high power conversion efficiency. For example, they are used in industrial automation and control, military equipment, scientific equipment, LED lighting, industrial equipment, communications equipment, electrical equipment, instrumentation, medical equipment, semiconductor cooling and heating, air purifiers, electronic refrigerator, LCD display, audio-visual products, security, computer chassis, digital products, equipment, and other fields.

A switch mode power supply (SMPS) usually includes a transformer that has a primary winding coupled to an input voltage and a secondary winding for providing an output. In charger applications of a switch mode power supply, the output can achieve CV (Constant Voltage)/CC (Constant Current) characteristic by different methods. For example, in secondary side regulation (SSR), a sensing signal at the secondary side is provided as a feedback signal to a controller. In primary side regulation (PSR), the sensing signal from an auxiliary winding at the primary side is provided to a controller. In either case, the output is maintained at the output terminal of the power supply by the controller, which can be based on pulse width modulation (PWM) or pulse frequency modulation (PFM).

Switch mode power supplies used as battery chargers are configured to charge batteries of electronic devices such as portable computers, cell phones, and digital cameras. The battery is usually connected to the battery charger through a charging cable. The voltage drop on the cable varies with the load. For example, the charging cable voltage drop is much larger at heavy loads than that at light loads, causing the voltage received at the device to vary. Therefore, the voltage drop on the charging cable needs to be compensated.

In a conventional compensation method, the cable voltage compensation is achieved by adding a voltage, which is proportional to the load current, to a CV (constant voltage) reference voltage to get a constant voltage at the output cable terminal. Some adjustable compensation methods require an extra pin to be added to the controller integrated circuit (IC).

BRIEF SUMMARY OF THE INVENTION

The inventors observed that conventional methods of compensating for charging cable voltage drop have many drawbacks. For example, the conventional compensation method that adds a compensation voltage to a reference voltage is not desirable, because it requires additional electronic elements and is not cost-effective. The additional compensation circuitry may require several revisions of the controller IC to calibrate to the charging cable. Further, the compensation is fixed by the circuit and cannot provide different compensation for different charging cables. In embodiments of the invention, the compensation is adjusted by adjusting the value of a resistor external to the controller IC. As a result, costly rework of the controller IC can be avoided, and the same controller IC can be calibrated to work with different charging cables. Some conventional methods provide adjustable compensation, but require an extra pin to be added to the controller IC, increasing design complexity and system cost. In embodiments of the invention, no extra pin is needed, because the adjustment resistor is connected to an existing pin of a standard package for controller IC. Alternatively, the resistor may be part of a standard power supply circuitry, eliminating the need for the extra adjustment resistor, further reducing system complexity and cost.

Embodiments of the present invention provide circuits and methods for compensating for the voltage drop of charging cable over the entire load range. Further, the cable compensation is adjustable and adaptable to meet application specifications such as different output currents, different output voltages, and different charging cable resistances. Examples are described using a closed loop constant voltage (CV) regulation in primary side regulated (PSR) system. However, it is understood that the invention can be applied to other controllers as well.

According to an embodiment of the invention, a battery charger controller introduces a current source in the feedback control loop such that the output voltage varies with the output current to compensate for charging cable voltage drop. In some embodiments, a portion of the output voltage is also proportional to the resistance of a compensation resistor that is external to the controller IC. Therefore, cable voltage drop compensation can be easily adapted using the resistor. In an embodiment, the adjustable resistor outside the controlling IC may be one of the feedback resistors connected at a voltage feedback pin, and no additional component is required. In another embodiment, the adjustable resistor is a resistor between the feedback resistors and the voltage feedback pin. In still another embodiment, the adjustable resistor is a resistor in parallel with a compensation capacitor. In embodiments of the invention, adjusting the resistance of the compensation resistor can change the voltage drop compensation and allow the power supply to meet requirements of different charging cable applications.

According to another embodiment of the invention, a switch mode power supply (SMPS) includes a transformer having a primary winding for coupling to an external input voltage, a secondary winding providing an output voltage of the power supply to a load, and an auxiliary winding. A voltage divider is coupled to the auxiliary winding for providing a feedback signal representative of the output voltage of the power supply, the voltage divider having first and second feedback resistors connected at a feedback node. The SMPS also includes a power switch for coupling to the primary winding of the power supply and a controller coupled to the power switch. The controller has a first terminal for coupling to the feedback node for receiving the feedback signal and a current source coupled to the first terminal. The current source is configured for providing a compensation current that is proportional to an output current of the power supply. The controller also includes a control signal generation circuit configured for generating a control signal for controlling the power switch based at least on comparing a voltage at the first terminal with a reference voltage such that the output voltage of the power supply increases with the output current. Further, the controller is configured such that a portion of the output voltage increases with the resistance of a compensation resistor.

According to another embodiment of the invention, a method for compensating for voltage drop on a charging cable for charging a battery includes providing a battery charger for connecting to a battery through the charging cable, which is characterized by a cable resistance. The battery charger includes a controller integrated circuit (IC) and an external compensation resistor. The controller IC has a first terminal for receiving a feedback signal representative of an output voltage of the power supply, a current source coupled to the first terminal of the controller, the current source configured for providing a compensation current that is proportional to an output current of the power supply, and a control signal generation circuit configured for generating a control signal based at least on comparing a voltage at the first terminal with a reference voltage. The controller IC also includes a second terminal for providing the control signal to the power switch to regulate the output voltage of the power supply such that a portion of the output voltage is proportional to a product of the output current and the resistance of a compensation resistor that is external to the controller IC. The method also includes determining the resistance of the external compensation resistor based on information regarding the charging cable such that the battery receives a constant charging voltage.

A further understanding of the nature and advantages of the present invention may be realized by reference to the remaining portions of the specification and the drawings.

DETAILED DESCRIPTION OF THE INVENTION

Embodiments of the present invention provide compensation methods to compensate the IR (current-resistance) voltage drop of charging cable to achieve accurate voltage control at the output cable terminal. The compensation can be adjusted for different charging cables by varying the resistance of a resistor external to the controller integrated circuit.

Figure 1:
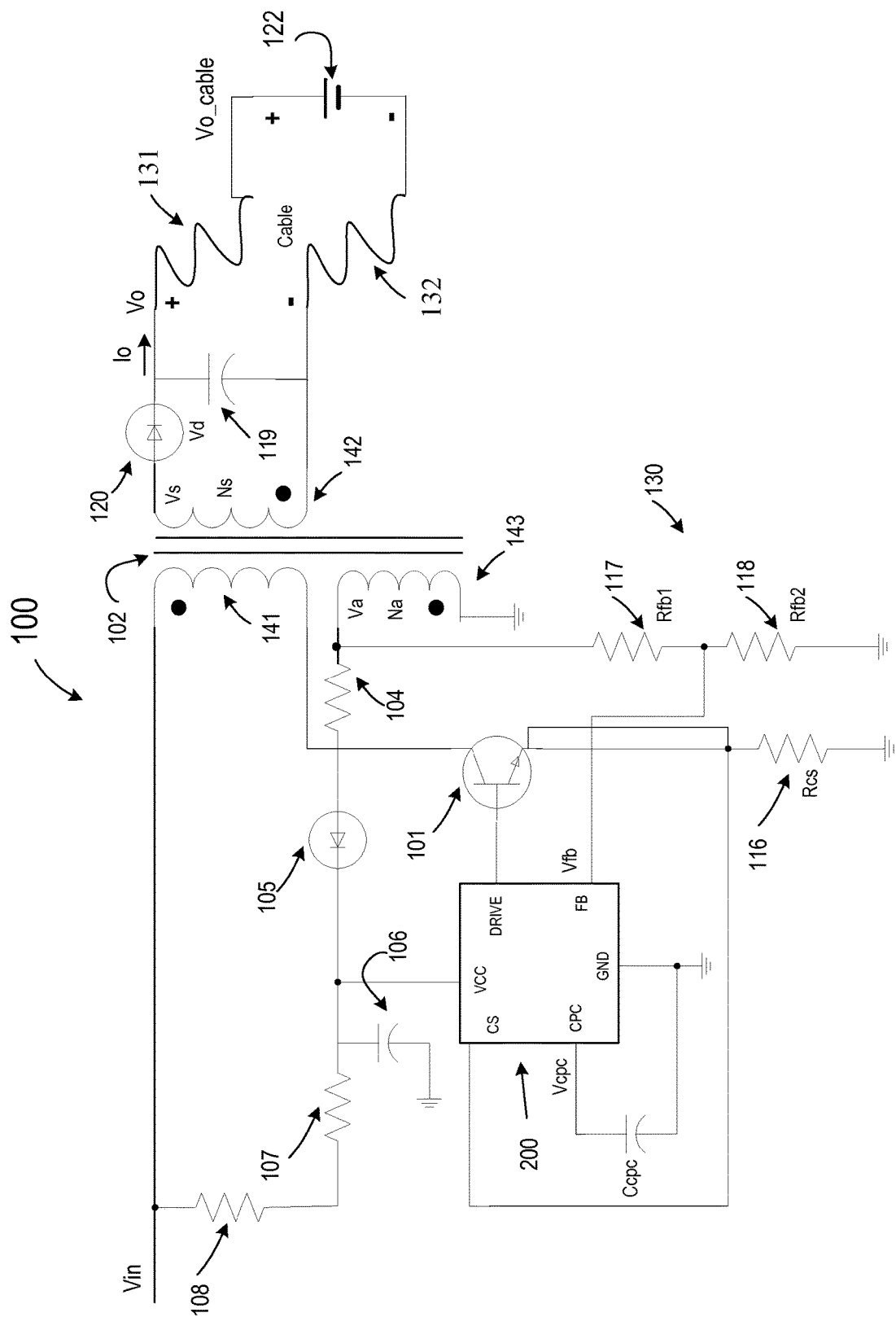
FIG. 1 is a simplified schematic diagram of an SMPS (a switch mode power supply) used as a battery charging system according to an embodiment of the present invention.

FIG. 1 is a simplified schematic diagram of a battery charging system according to an embodiment of the present invention. The battery charging system includes a primary-side regulated power supply 200, a battery 122, and charging cables 131 and 132, which connect battery 122 to the power supply. As shown in FIG. 1, the output voltage at the output terminals of the power supply is Vo, and the voltage at the terminals of the battery 122 is Vo_cable.

Switched mode power supply (SMPS) 100 includes a transformer 102, which includes a primary winding 141 for coupling to an input voltage Vin and a secondary winding 142 for providing the output voltage Vo through a rectifying diode 120 and a capacitor 119. Transformer 102 also has an auxiliary winding 143 for providing a feedback signal Vfb representative of the output of the power supply. In FIG. 1, Vs denotes the voltage at the secondary winding, and Va denotes the voltage at the auxiliary winding. Ns is the coil turns in the secondary winding, and Na is the coil turns of the auxiliary winding.

Power supply 100 also includes a power switch 101 coupled to primary winding 141 and controller 200 for receiving a control signal to turn on and off power switch 101 to control the primary current through primary winding 141 in order to regulate output voltage Vo. In FIG. 1, power switch 101 is shown as a bipolar power transistor. However, in other embodiments, a power MOSFET or another type of power switch can also be used. In the embodiment of FIG. 1, controller 200 is a single integrated circuit (IC) having several terminals, for example, VCC, GND, FB, CS, DRIVE, and CPC. Controller 200 receives its operating power at the VCC terminal from capacitor 106. During startup, capacitor 106 is charged by a current provided by input voltage Vin through resistors 107 and 108. In normal operation, capacitor 106 is charged by a current provided by auxiliary winding 143 through resistor 104 and diode 105. Terminal FB receives feedback signal Vfb from auxiliary winding 123 through a voltage divider 130 formed by resistors 117 and 118, with resistances Rfb1 and Rfb2, respectively. Terminal CS receives a current sense voltage signal representative of the primary current through a current sense resistor 116 with a resistance Rcs. Controller 200 is configured to provide a control signal at the DRIVE terminal to control power switch 101, based on information provided at the FB and CS terminals. The CPS terminal is coupled to a compensation capacitor Ccpc with a voltage Vcps.

In the battery charging system, the resistance of the charging cables causes a voltage drop between the output voltage of the power supply Vo and the voltage presented by the cable Vo_cable, which is the input voltage to the battery. If the controller is configured to maintain a constant Vo, then Vo_cable would be equal to Vo minus the voltage drop on the charging cables. Let the output current of the power supply be Io, which represents the load current of the power supply. Then the voltage drop is proportional to Io times the resistance of the charging cable. In order to compensate for the voltage drop of charging cable over the load current range, Vo needs to be controlled such that Vo increases with the load current Io in order to maintain Vo_cable at a constant. Embodiments of the present invention provide circuits and methods for compensating for charging cable voltage drop that can be adjusted for different cables and load conditions. In some embodiments, the adjustment is made by selecting a resistance of a resistor external to the controller integrated circuit. Further, no additional dedicated pin connection needs to be added to the controller IC for connection to the adjustment resistor.

Figure 2:
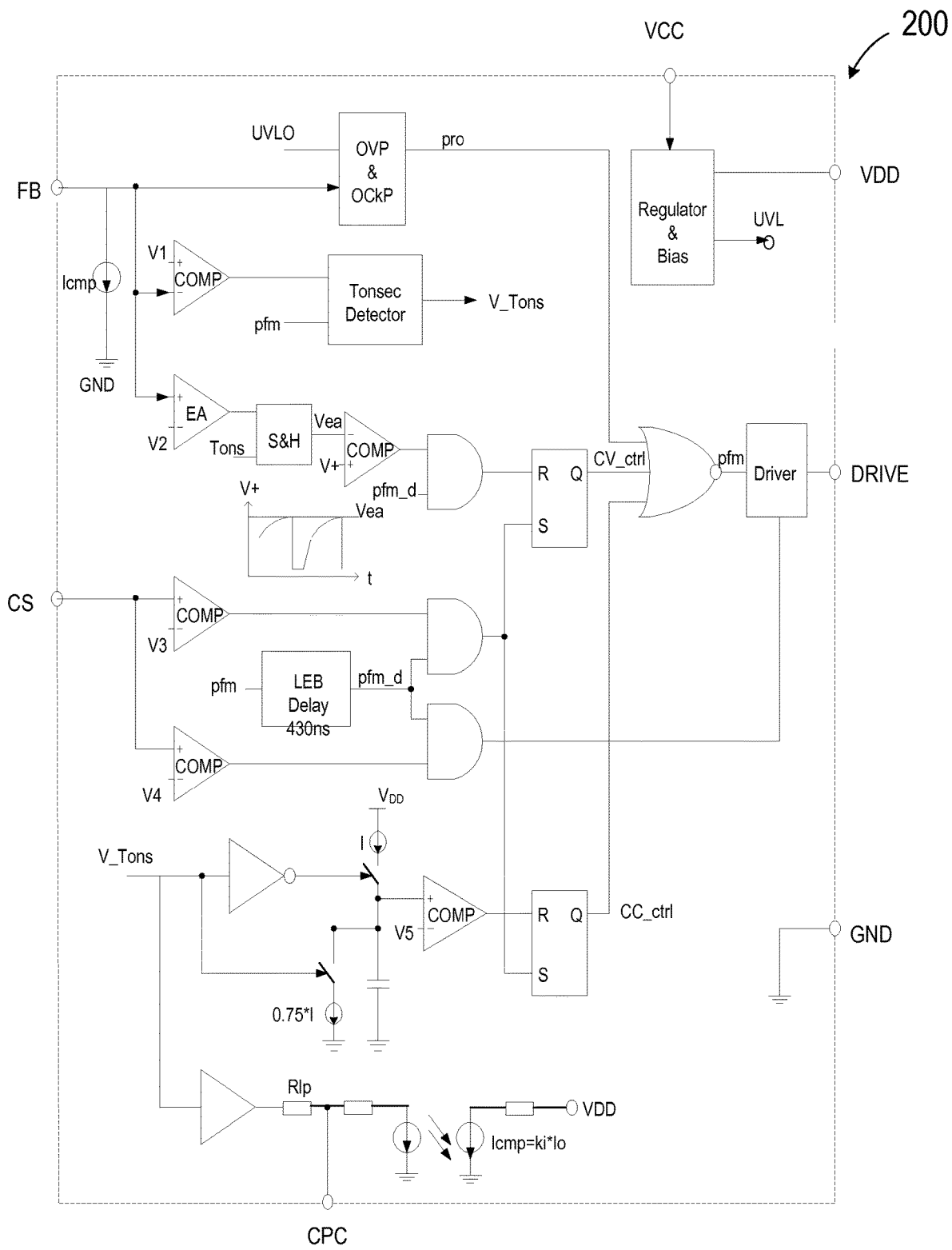
FIG. 2 is a schematic diagram of a controller for a switch mode power supply according to an embodiment of the present invention.

FIG. 2 is a schematic diagram of a controller 200 for a switch mode power supply according to an embodiment of the present invention. As shown in FIG. 2, controller 200 includes circuits for performing pulse frequency modulation (PFM) control functions. However, it is understood that a pulse width modulation (PWM) control can also be used. In FIG. 2, controller 200 includes a terminal FB for receiving a feedback signal Vfb. Controller 200 also has a control signal generation circuit configured for generating a control signal at the DRIVE terminal for controlling an on time and off time of the power switch. In FIG. 2, a comparison of feedback signal voltage signal Vfb with a reference voltage is performed by error amplifier EA. Feedback signal Vfb and current sense signal Vcs from the CS terminal are used by the controller to turn on and off the power switch to control the current flow in the primary winding and to regulate the power supply output voltage Vo in the constant voltage control mode. In response to the primary current flow, a secondary current is induced in the secondary winding. In the description below, the on-time of the secondary current is designated as Tons, and the off-time of the secondary current is designated as Toffs. In CC (constant current) regulation, the CC loop control function keeps a fixed proportion between on-time Tons and off-time Toffs of secondary side by discharging or charging a capacitor in the controller as shown in FIG. 2. Controller 200 also includes references voltages V1-V5 that are design parameters selected according to specific applications.

As shown in FIG. 2, controller 200 also includes a current source Icmp coupled between the FB terminal and a ground GND. The current source is configured for providing a compensation current Icmp that is proportional to an output current Io of the power supply. In embodiments of the invention, compensation current Icmp is added to the feedback terminal to modify the control signal such that the output voltage of the power supply Vo increases with the output current Io. More details are described with reference to FIG. 3.

Figure 3:
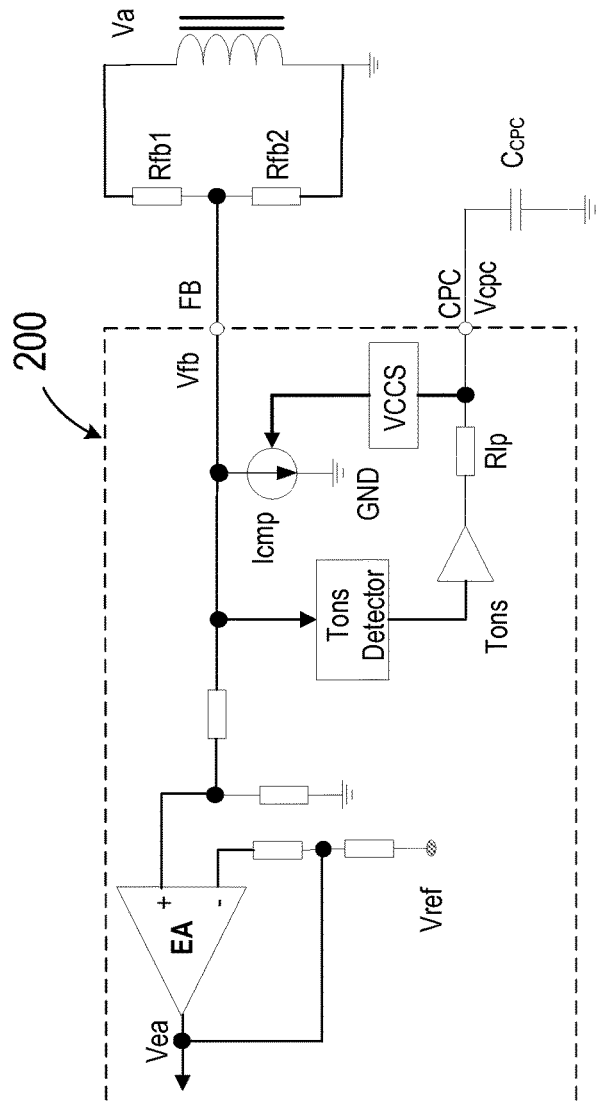
FIG. 3 is a schematic diagram illustrating a portion of a controller associated with charging cable compensation according to an embodiment of the invention.

FIG. 3 is a schematic diagram illustrating a portion of controller 200 associated with charging cable compensation according to an embodiment of the invention. As shown in FIG. 3, auxiliary winding voltage Va is detected by the FB pin of the controller IC as a voltage signal Vfb through a feedback voltage divider block including resistances Rfb1 and Rfb2. Vfb and a reference voltage Vref are coupled to an error amplifier EA, which calculates an error voltage Vea that represents the difference between Vfb and Vref.

As shown in FIG. 3, in order to provide compensation for the charging cable voltage drop, a compensation current Icmp is inserted in controller 200 between the FB terminal and ground GND. In embodiments of the invention, Icmp is derived by a voltage controlled current source (VCCS) from a voltage Vcpc that is proportional to the output current Io. As a result, Icmp is proportional to Io, as described below.

In a switch mode power supply, the output current Io is the mean value of the current through the secondary side diode Vd. If the peak value of the secondary diode current is ipks, the time of ON time of the secondary diode is Tons, and the switching period is Tsw, then, $$Io = \frac{1}{2} \cdot ipks \cdot \frac{Tons}{Tsw}$$

As shown, output current Io is proportional to the duty cycle of secondary on-time Tons/Tsw.

Figure 4:
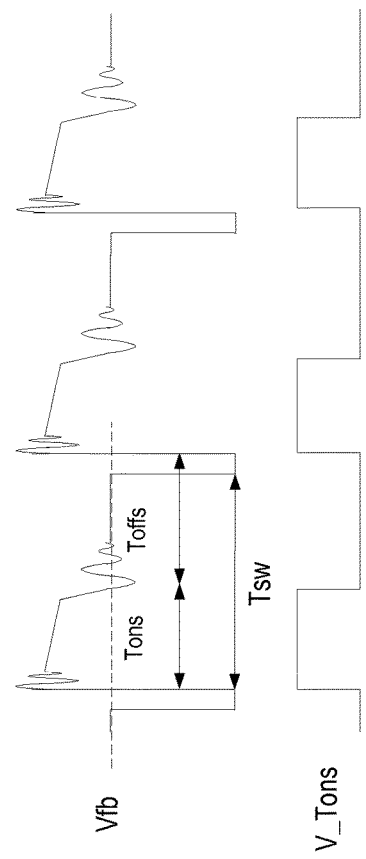
FIG. 4 is a waveform diagram illustrating selected timing parameters in the circuit of FIG. 3.

According to embodiments of the invention, the duty cycle of secondary on-time can be determined from the transient voltage at the FB pin of the controlling IC. The duty cycle can be determined, for example, through a low-pass filter in an analog method, or by calculating the time ratio of secondary on-time and switching time period in a digital method. FIG. 4 is a waveform diagram illustrating selected timing parameters in the power supply. As shown in FIG. 4, timing information about Tons and Tsw is contained in the voltage signal Vfb. A Tons detector is configured to determine Tons by the positive voltage of Vfb filtered as V_Tons. Here, the high voltage of V_Tons is at VDD which is a constant voltage generated from VCC inside the controlling IC. V_Tons is then filtered by a low-pass filter comprising Rlp and Ccpc as shown in FIG. 3. The capacitor voltage Vcpc can be shown to be proportional to the output load current Io.

$$Vcpc = VDD \cdot \frac{Tons}{Tsw} = \frac{2 \cdot VDD}{ipks} \cdot Io$$

As shown in FIG. 3, a voltage-controlled current source (VCCS) is connected to Vcpc to generate compensation current Icmp, which is proportional to Vcpc and is also proportional to the output load current Io.

$$Icmp = kcpc \cdot Vcpc = \frac{2 \cdot kcpc \cdot VDD}{ipks} \cdot Io = ki \cdot Io$$

where kcps and ki are constants. As shown in FIG. 3, current Icmp flows from the FB pin inside the controller IC and causes Vfb to be lowered by an amount proportional to Io, the output load current. As explained below, the controller is now configured to regulate the power supply to maintain an output voltage Vo that compensates for the voltage drop across the charging cable.

As shown in FIG. 3, error voltage Vea is derived from error amplifier EA when Vfb deviates from Vref. As depicted in FIG. 2, Vea is used to produce a drive signal DRIVE that turns on the power switch to change the output voltage Vo, which is reflected in auxiliary winding voltage Va to allow the controller to maintain Vfb at Vref. As described below, in embodiments of the invention, when output current Io changed from open load (Io_min) to full load (Io_max), the additional compensation voltage at Va will be increased linearly.

At open load, when Io=0, the relationship between Va and Vref is, $$Va = \left(1 + \frac{Rfb1}{Rfb2}\right) \cdot Vref$$

Further, the relationship between Va and Vo is determined by the coil turn ratios, $$Va = \frac{Na}{Ns} \cdot Vs = \frac{Na}{Ns} \cdot (Vo + Vd)$$

where Na and Ns are the coil turns of auxiliary winding and secondary winding, respectively, Vs is voltage at the secondary winding, and Vd is the voltage across the diode on the secondary side.

From the above two equations, the relationship between output voltage Vo and output current Io is, $$Vo = Va \cdot \frac{Ns}{Na} - Vd$$
$$= \left[\left(1 + \frac{Rfb1}{Rfb2}\right) \cdot Vref\right] \cdot \frac{Ns}{Na} - Vd$$

Similarly, at heavy load, when Io is not zero, the relationship between Va and Vref includes the compensation current Icmp, $$Va = \left(1 + \frac{Rfb1}{Rfb2}\right) \cdot Vref + Icmp \cdot Rfb1$$

where, $$Icmp == ki \cdot Io$$

Then the relationship between output voltage Vo and output current Io is, $$Vo = Va \cdot \frac{Ns}{Na} - Vd$$
$$= \left[\left(1 + \frac{Rfb1}{Rfb2}\right) \cdot Vref + Icmp \cdot Rfb1\right] \cdot \frac{Ns}{Na} - Vd$$
$$= \left[\left(1 + \frac{Rfb1}{Rfb2}\right) \cdot Vref + ki \cdot Io \cdot Rfb1\right] \cdot \frac{Ns}{Na} - Vd$$

The above equation can be rewritten as follows.

$$Vo = K1 + K2 \cdot Io$$
$$\text{where: } K2 = ki \cdot \frac{Ns}{Na} \cdot Rfb1$$

It can be seen that the controller is configured to cause the output voltage Vo of the switch mode power supply to include a component "K2·Io" which is proportional to a product of the output current Io and a coefficient K2, whose value depends linearly on the resistance of resistor Rfb1. Thus, the output voltage of the charger Vo is configured to increase linearly with the output load current Io, with a proportionality constant that varies with the resistance of resistor Rfb1, which is external to the controller IC.

Assuming the resistance of the charging cable is Rcable, then, $$Vo = Vo\_cable + Rcable \cdot Io$$

By selecting a resistance for resistor Rfb1 to compensate for the charging cable voltage drop, and the output voltage at the charging cable Vo_cable can be maintained at a constant. In this embodiment, Rfb1 is the cable compensation resistor Rcmp, which can be adjusted to meet different application specifications with different charging cable resistances in different kinds of cables and different cable lengths.

Figure 5:
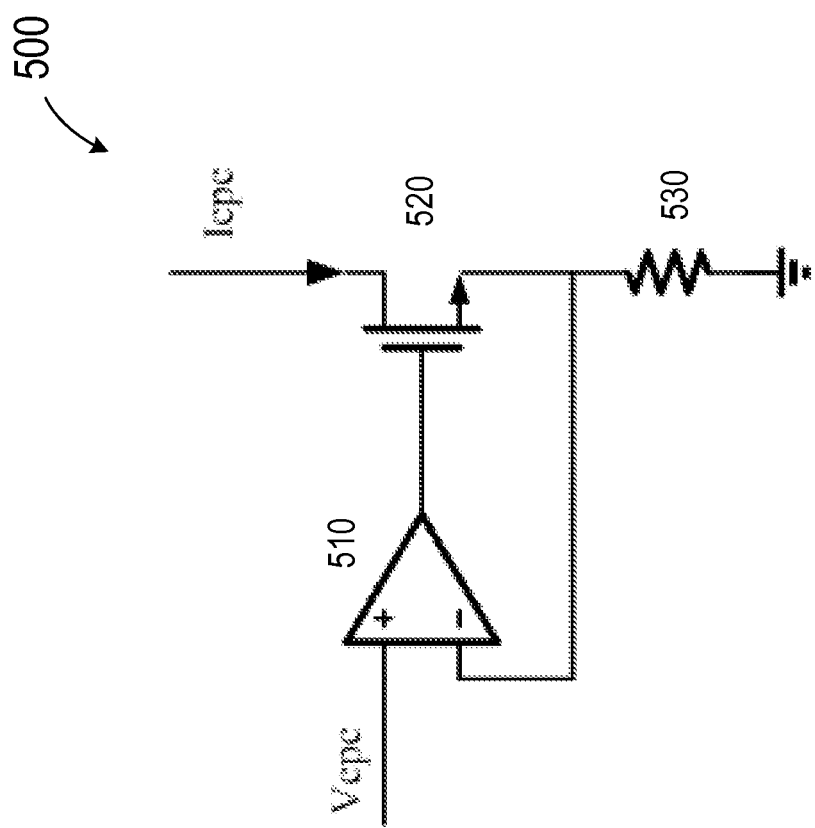
FIG. 5 is a simplified schematic diagram illustrating a voltage-controlled current source (VCCS) according to an embodiment of the present invention.

FIG. 5 is a simplified schematic diagram illustrating a voltage-controlled current source (VCCS) according to an embodiment of the present invention. As shown VCCS 500 includes an amplifier 510 coupled to an MOS transistor 520 and a resistor 530. VCCS 500 is configured such that output current Icpc is proportional to input voltage Vcps. In one embodiment, Icpc is coupled to the FB terminal through a current mirror. Of course, the VCCS and current mirror can also be implemented using other known circuit techniques.

Figure 6:
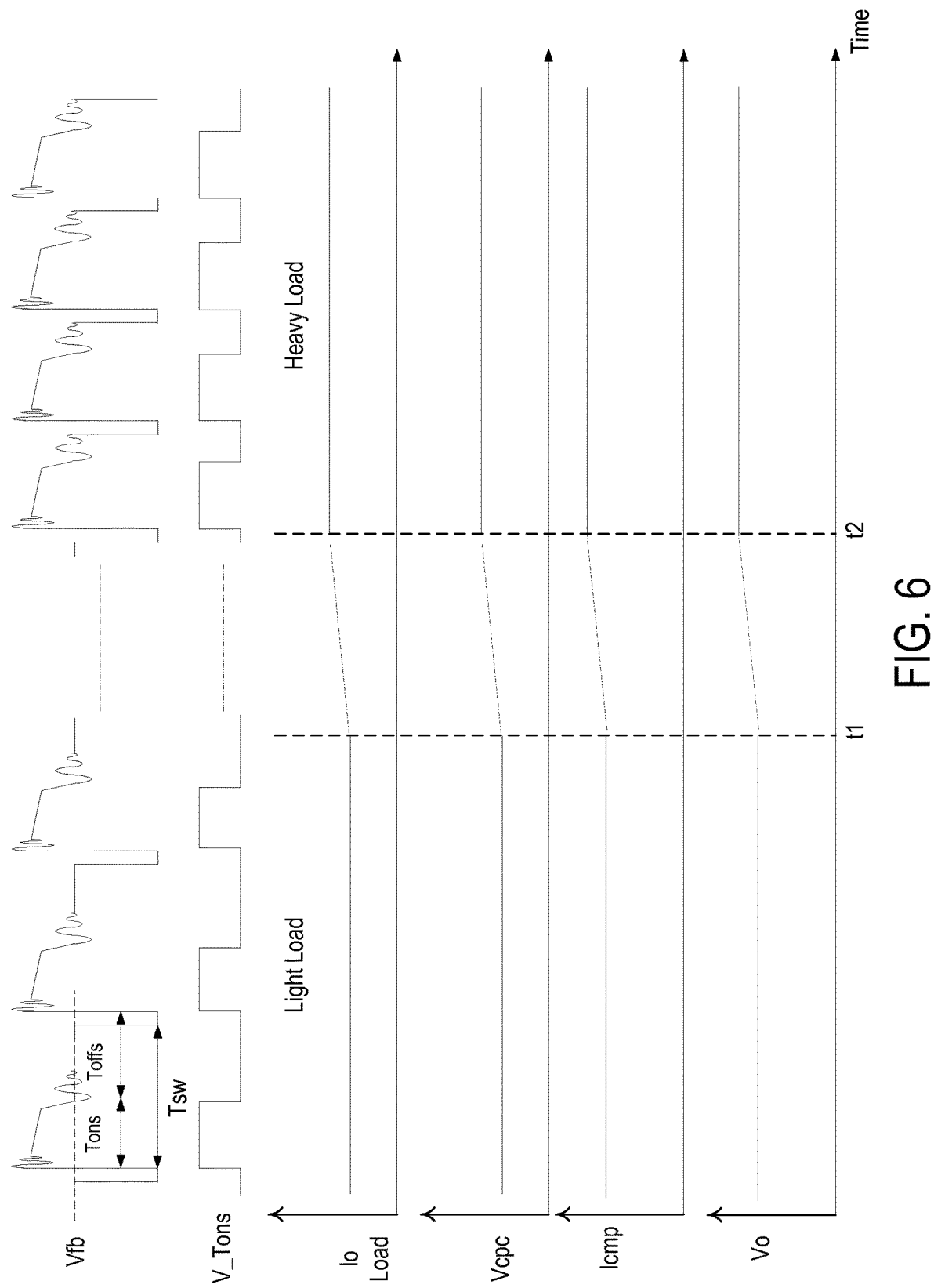
FIG. 6 is a waveform diagram illustrating timing signals in a battery charger with charging cable compensation according to an embodiment of the present invention.

FIG. 6 is a waveform diagram illustrating timing signals in a battery charger with charging cable compensation according to an embodiment of the present invention. As shown, the output load current Io increases from light load to heavy load between time t1 to time t2. As described above, voltage Vcps increases with the load, so does the compensation current Icmp which is derived from Vcps. As a result the output voltage Vo increases with output load to compensate for the charging cable resistance.

Figure 7:
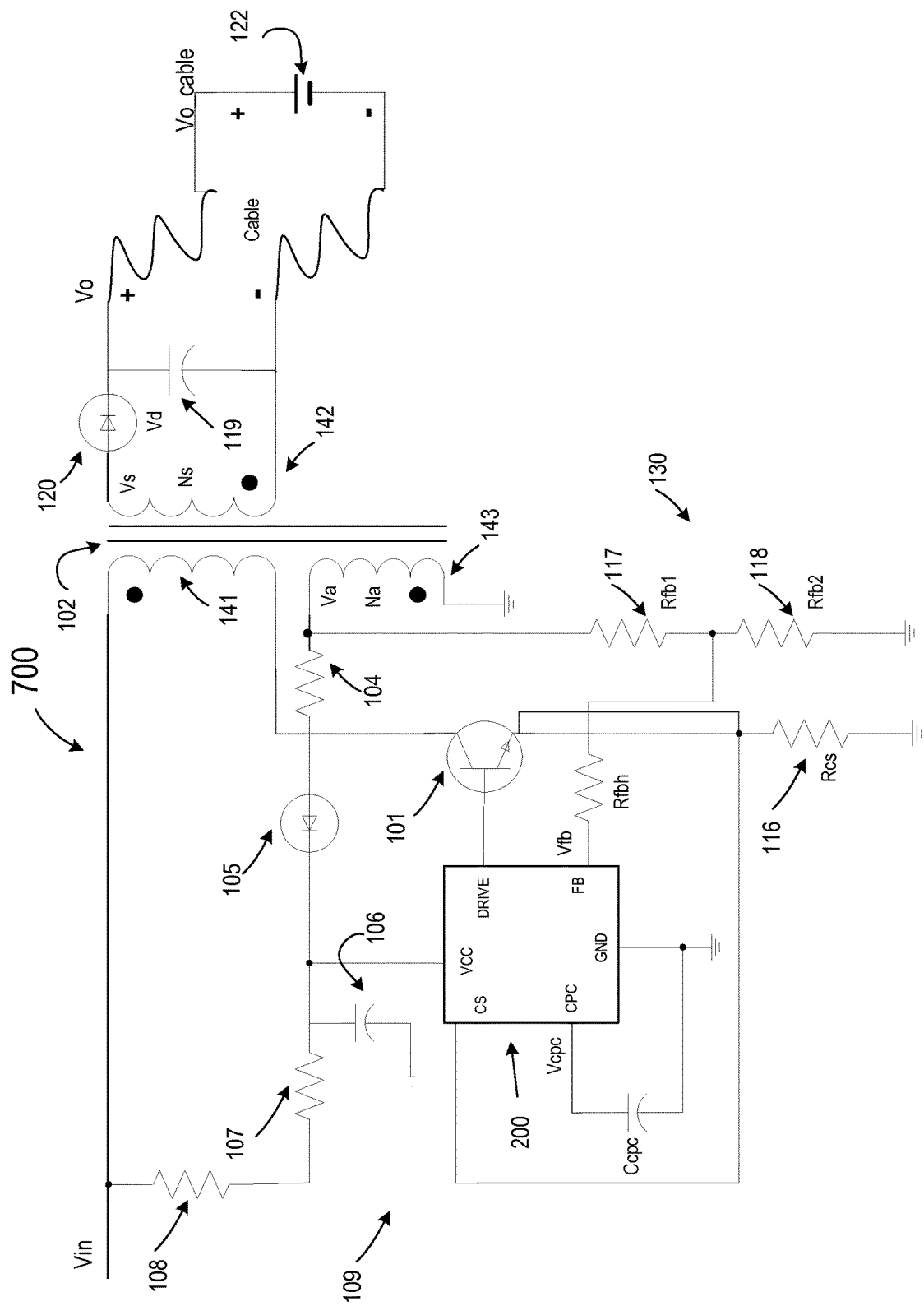
FIG. 7 is a simplified schematic diagram of a battery charging system including charging cable compensation according to another embodiment of the present invention.

FIG. 7 is a simplified schematic diagram of a battery charging system including charging cable compensation according to another embodiment of the present invention. Battery charging system of FIG. 7 is similar to the battery charging system described above in connection with FIG. 1. The battery charging system includes a primary-side regulated power supply 700 as the battery charger, a battery 122, and charging cables 131 and 132, which connect battery 122 to the power supply. Many of the similar components are not described here. Similar to battery charger 100, battery charger 700 also includes adjustable charging cable compensation. However, battery charger 700 has a different charging cable compensation method. As shown in FIG. 7, battery charger 700 includes a resistor Rfbh coupled between the FB terminal of the controller and the common node between feedback resistors Rfb1 and Rfb2. The compensation method is described below with reference to FIG. 8.

Figure 8:
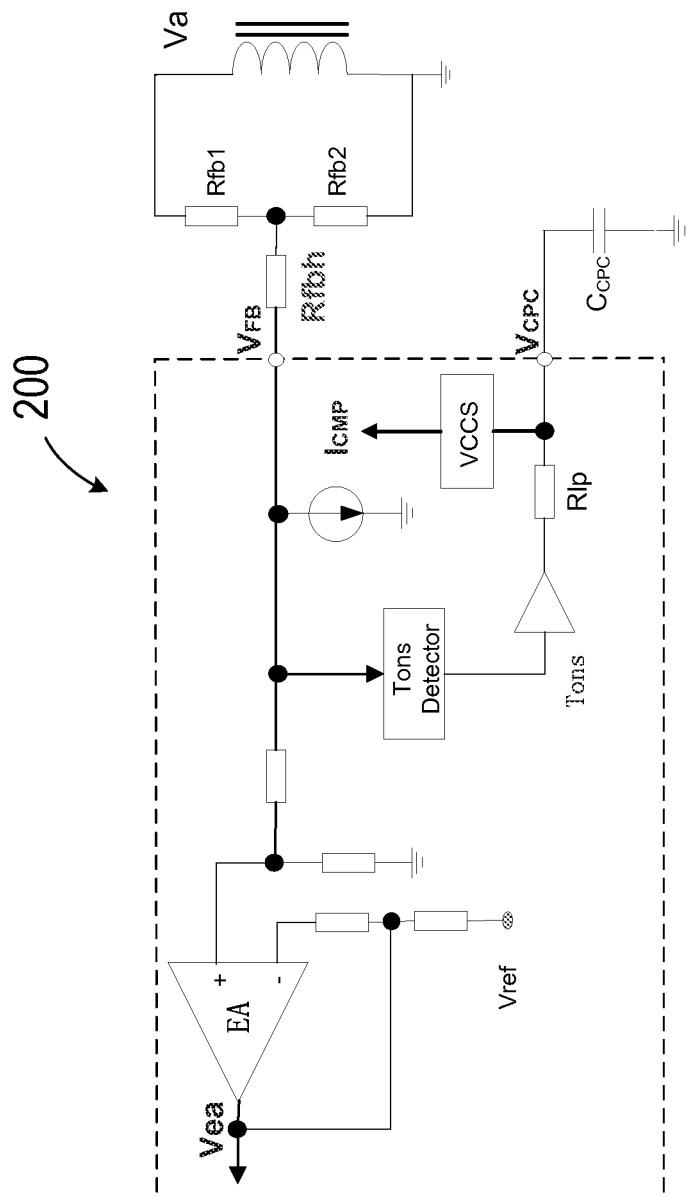
FIG. 8 is a schematic diagram illustrating a portion of the controller associated with charging cable compensation in battery charging system in FIG. 7 according to an embodiment of the invention.

FIG. 8 is a schematic diagram illustrating a portion of controller 200 associated with charging cable compensation in battery charger 700 in FIG. 7 according to an embodiment of the invention. In this embodiment, a resistor Rfbh is added between the FB pin and the node between Rfb1 and Rfb2. As shown in FIG. 8, auxiliary winding voltage Va is detected by the FB pin of the controller IC as a voltage signal Vfb through a feedback voltage divider block including resistances Rfb1 and Rfb2. Vfb and a reference voltage Vref are coupled to an error amplifier EA, which calculates an error voltage Vea that represents the difference between Vfb and Vref.

As shown in FIG. 8, in order to provide compensation for charging cable voltage drop, a compensation current Icmp is inserted in controller 200 between the FB terminal and ground GND. In embodiments of the invention, Icmp is proportional to Io. As described below, Icmp is derived by a voltage-controlled current source (VCCS) from a voltage Vcpc that is proportional to the output current Io as described below.

The relationship between Va and Vref at open load is, $$Va = \left(1 + \frac{Rfb1}{Rfb2}\right) \cdot Vref$$

Further, the relationship between Va and Vo is determined by the coil turn ratios, $$Va = \frac{Na}{Ns} \cdot Vs = \frac{Na}{Ns} \cdot (Vo + Vd)$$

where Na and Ns are the coil turns of auxiliary winding and secondary winding, respectively, and Vd is the voltage across the rectifying diode on the secondary side.

From the above two equations, the relationship between output voltage Vo and output current Io is, $$Vo = Va \cdot \frac{Ns}{Na} - Vd$$
$$= \left[\left(1 + \frac{Rfb1}{Rfb2}\right) \cdot Vref\right] \cdot \frac{Ns}{Na} - Vd$$

At heavy load, when Io is not zero, and if the current through the resistor Rfb1 is much more than the current Icmp inside the IC, $$Va = \left(1 + \frac{Rfb1}{Rfb2}\right) \cdot (Vref + Icmp \cdot Rfbh)$$

where Icmp=ki·Io. Then the relationship between output voltage Vo and output current Io is, $$Vo = Va \cdot \frac{Ns}{Na} - Vd$$
$$= \left[\left(1 + \frac{Rfb1}{Rfb2}\right) \cdot (Vref + Icmp \cdot Rfbh)\right] \cdot \frac{Ns}{Na} - Vd$$
$$= \left[\left(1 + \frac{Rfb1}{Rfb2}\right) \cdot (Vref + ki \cdot Io \cdot Rfbh)\right] \cdot \frac{Ns}{Na} - Vd$$

It can be seen that the controller is configured to cause the output voltage Vo of the switch mode power supply to include a component proportional to a product of the output current Io and a coefficient, whose value depends linearly on the resistance of resistor Rfbh, which is external to the controller IC. In this example, Rfbh is the cable compensation resistor Rcmp.

Rcmp=Rfbh

By varying Rcmp (Rfbh), the cable compensation voltage can be changed to meet different application specification with different charging cable resistance in different kinds of cables and different cable lengths.

Figure 9:
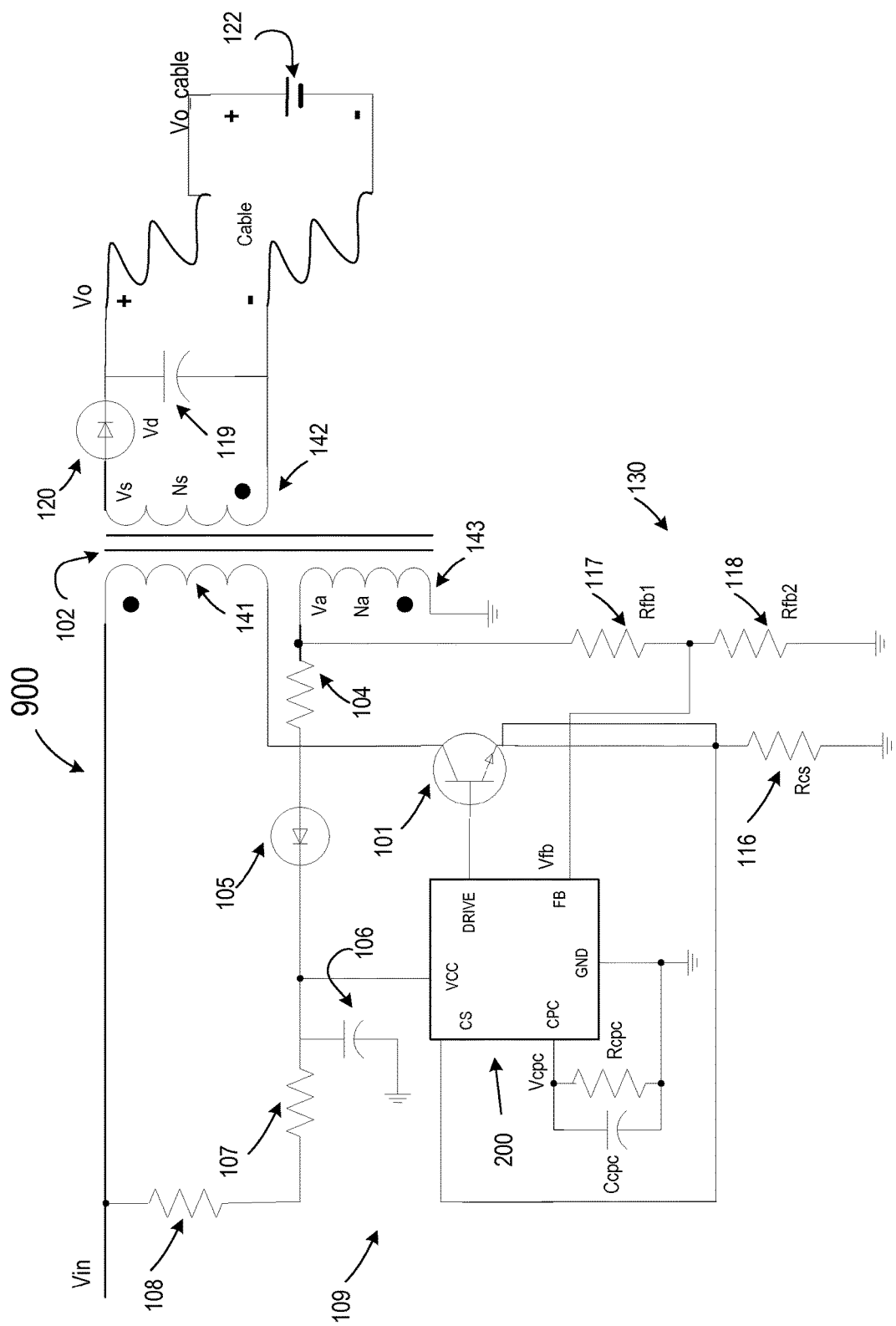
FIG. 9 is a simplified schematic diagram of a battery charging system including charging cable compensation according to yet another embodiment of the present invention.

FIG. 9 is a simplified schematic diagram of a battery charging system including charging cable compensation according to another embodiment of the present invention. Battery charging system of FIG. 9 is similar to the battery charging system described above in connection with FIG. 1. The battery charging system includes a primary-side regulated power supply 900 as the battery charger, a battery 122, and charging cables 131 and 132, which connect battery 122 to the power supply. Many of the similar components are not described here. Similar to battery charger 100, battery charger 900 also includes adjustable charging cable compensation. However, battery charger 900 has a different charging cable compensation method. As shown in FIG. 9, battery charging system 900 includes a resistor Rcpc coupled in parallel with compensation capacitor Ccpc. The compensation method is described below with reference to FIG. 10.

Figure 10:
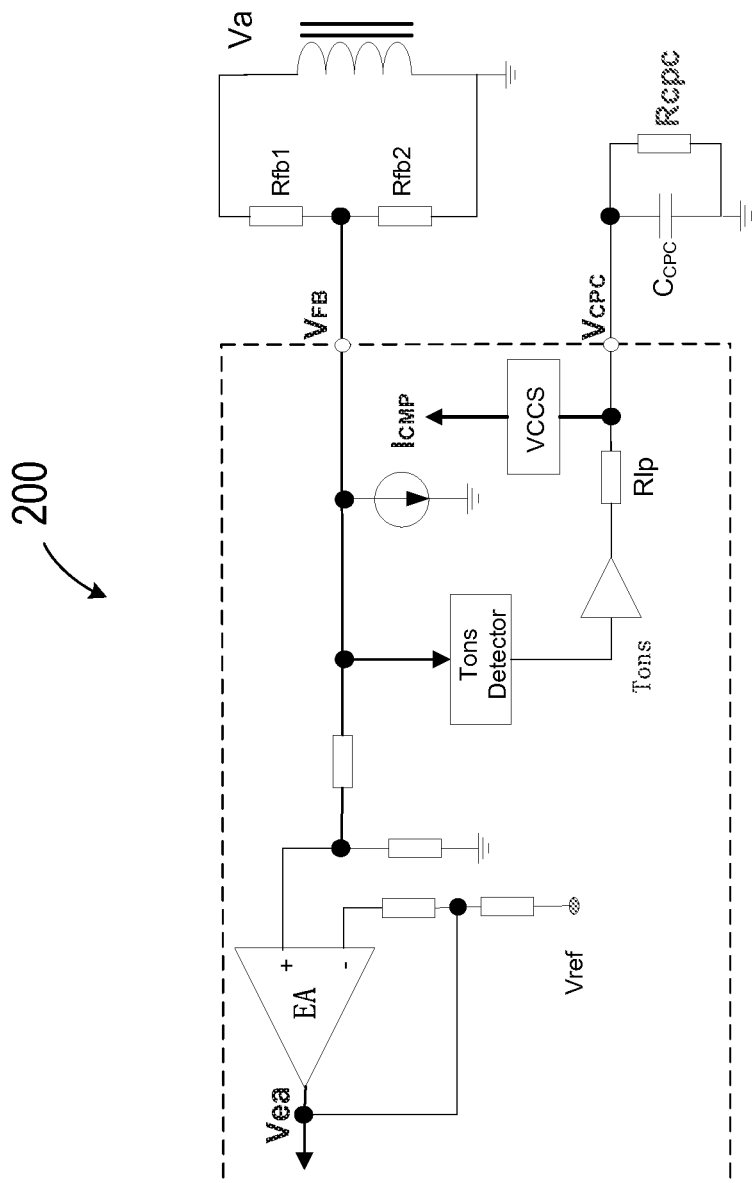
FIG. 10 is a schematic diagram illustrating a portion of the controller associated with charging cable compensation in battery charging system in FIG. 9 according to an embodiment of the invention.

FIG. 10 is a schematic diagram illustrating a portion of controller 200 associated with charging cable compensation in battery charger 900 in FIG. 9 according to an embodiment of the invention. In this embodiment, a resistor Rcpc is added to the CPC pin and in parallel with capacitor Ccpc. As shown in FIG. 10, auxiliary winding voltage Va is detected by the FB pin of the controller IC as a voltage signal Vfb through a feedback voltage divider block including resistances Rfb1 and Rfb2. Vfb and a reference voltage Vref are coupled to an error amplifier EA, which calculates an error voltage Vea that represents the difference between Vfb and Vref.

As shown in FIG. 10, in order to provide compensation for charging cable voltage drop, a compensation current Icmp is inserted in controller 200 between the FB terminal and ground GND. In embodiments of the invention, Icmp is proportional to Io. As described below, Icmp is derived by a voltage controlled current source (VCCS) from a voltage Vcpc that is proportional to the output current Io. Further, Icmp can be adjusted by varying compensation resistor Rcpc coupled in parallel with compensation capacitor Ccpc, as described below.

At open load, or when Io=0, the relationship between Va and Vref is, $$Va = \left(1 + \frac{Rfb1}{Rfb2}\right) \cdot Vref$$

Further, the relationship between Va and Vo is determined by the coil turn ratios, $$Va = \frac{Na}{Ns} \cdot Vs = \frac{Na}{Ns} \cdot (Vo + Vd)$$

where Na and Ns are the coil turns of auxiliary winding and secondary winding, respectively, and Vd is the voltage across diode 119 on the secondary side.

From the above two equations, the relationship between output voltage Vo and output current Io is, $$Vo = Va \cdot \frac{Ns}{Na} - Vd$$
$$= \left[\left(1 + \frac{Rfb1}{Rfb2}\right) \cdot Vref\right] \cdot \frac{Ns}{Na} - Vd$$

Similarly, at heavy load, when Io is not zero, the relationship between Va and Vref includes the compensation current Icmp, $$Va = \left(1 + \frac{Rfb1}{Rfb2}\right) \cdot (Vref + Icmp \cdot Rfb1)$$

where, $$Vcpc = VDD \cdot \frac{Tons}{Tsw} \cdot \frac{Rcpc}{Rcpc + Rlp} = \frac{2 \cdot VDD}{ipks} \cdot \frac{Rcpc}{Rcpc + Rlp} \cdot Io$$

$$Icmp = kcpc \cdot Vcpc = \frac{2 \cdot kcpc \cdot VDD}{ipks} \cdot \frac{Rcpc}{Rcpc + Rlp} \cdot Io = ki \cdot \frac{Rcpc}{Rcpc + Rlp} \cdot Io$$

Then the relationship between the output voltage and the output current is shown as follows, $$Vo = Va \cdot \frac{Ns}{Na} - Vd$$

$$= \left[\left(1 + \frac{Rfb1}{Rfb2}\right) \cdot Vref + Icmp \cdot Rfb1\right] \cdot \frac{Ns}{Na} - Vd$$

$$= \left[\left(1 + \frac{Rfb1}{Rfb2}\right) \cdot Vref + ki \cdot Io \cdot \frac{Rcpc}{Rcpc + Rlp} \cdot Rfb1\right] \cdot \frac{Ns}{Na} - Vd$$

It can be seen that the controller is configured to cause the output voltage Vo of the switch mode power supply to include a component proportional to a product of the output current Io and a coefficient whose value depends linearly on the resistance of resistor Rcpc. Thus, the output voltage of the charger Vo is configured to increase linearly with the output load current Io, with a proportionality constant that varies with the resistance of a resistor Rcpc, which is external to the controller IC.

By selecting a proper resistance for resistor Rcpc to compensate for the charging cable voltage drop, and the output voltage at the charging cable Vo_cable can be maintained at a constant. In this embodiment, Rcpc is the cable compensation resistor Rcmp, which can be adjusted to meet different application specifications with different charging cable resistances in different kinds of cable and different cable lengths.

Thus, according to embodiments of the invention, a method for compensating for voltage drop on a charging cable in a battery charger includes providing a battery charger for connecting to a battery through a charging cable, which is characterized by a cable resistance. The battery charger includes a controller integrated circuit (IC) and an external compensation resistor. The battery charger is configured such that the output voltage increases linearly with the resistance of the compensation resistor. The method also includes determining the resistance of the external compensation resistor based on information regarding the charging cable such that the output voltage increases with the output current to compensate for charging cable voltage drop. In some embodiments, the resistance of the external compensation resistor can be selected experimentally for different charging cables by measuring the voltage at the output terminals of the charging cables when the output current is varied from light load to heavy load. Alternatively, the resistance of the external compensation resistor can be selected using simulation techniques.

In some embodiments, the controller IC includes a first terminal for receiving the feedback signal representative of an output voltage of the battery charger and a current source coupled between the first terminal and a ground of the controller. The current source is configured for providing a compensation current that is proportional to an output current of the battery charger. The controller also includes a control signal generation circuit configured for generating a control signal based at least on comparing a voltage at the first terminal with a reference voltage for regulating the output voltage such that the output voltage increases with the output current. The controller is configured to cause the output voltage Vo of the switch mode power supply to include a component proportional to a product of the output current Io and a coefficient whose value depends linearly on the resistance of the compensation resistor, which is outside of the controller IC.

In some embodiments, the battery charger further includes a transformer having a primary winding, a secondary winding, and an auxiliary winding. The primary winding is for coupling to an external input voltage, and the secondary winding is for providing an output voltage to the load. The battery charger also includes a voltage divider coupled to the auxiliary winding for providing a feedback signal representative of the output voltage of the power supply. the voltage divider has first and second feedback resistors connected at a feedback node. The battery charger also has a power switch for coupling to the primary winding of the power supply. In a specific embodiment, the feedback node is coupled to the first terminal of the controller, and the first feedback resistor is the compensation resistor. In another embodiment, the feedback node is coupled to the first terminal of the controller through the compensation resistor. In yet another embodiment, the controller IC also has a compensation terminal for coupling to an external compensation capacitor and the compensation resistor.

While the above is a description of specific embodiments of the invention, the above description should not be taken as limiting the scope of the invention. Therefore, it is appreciated that the examples and embodiments described herein are for illustrative purposes only and that various modifications or changes in light thereof will be suggested to persons skilled in the art and are to be included within the spirit and purview of this application.

What is claimed is:

1. A switch mode power supply (SMPS), comprising:
   a transformer having a primary winding for coupling to an external input voltage, a secondary winding providing an output voltage of the power supply to a load, and an auxiliary winding;
   a voltage divider coupled to the auxiliary winding for providing a feedback signal representative of the output voltage of the power supply, the voltage divider having first and second feedback resistors connected at a feedback node;
   a power switch for coupling to the primary winding of the power supply; and
   a controller coupled to the power switch, the controller including:
     a first terminal for coupling to the feedback node for receiving the feedback signal;
     a secondary current on time detector coupled to the feedback node for providing an on time voltage signal during the secondary current on time, the on time voltage signal being a voltage pulse signal having a constant magnitude with a duration representing a duration of the secondary current on time;
     a current source coupled to the first terminal, the current source coupled to the secondary current on time detector and configured for providing a compensation current that flows from the first terminal, the compensation current being proportional to an output current of the power supply; and
     a control signal generation circuit coupled to the first terminal and having an error amplifier configured for generating a control signal for controlling the power switch based at least on comparing a voltage at the first terminal with a reference voltage such that the output voltage of the power supply increases with the output current;
   wherein the current source is configured for providing the compensation current based on an output of the secondary current on time detector, and not on an output of the error amplifier of the control signal generation circuit.

2. The switch mode power supply of claim 1, further comprising a compensation resistor characterized by a resistance such that the output voltage of the power supply is compensated for a voltage drop on a charging cable when the switch mode power supply is charging a battery through the charging cable.

3. The switch mode power supply of claim 2, wherein the first feedback resistor is the compensation resistor.

4. The switch mode power supply of claim 2, wherein the compensation resistor is coupled between the feedback node and the first terminal of the controller.

5. The switch mode power supply of claim 2, wherein the current source comprises a voltage-controlled current source configured to generate the compensation current based on a voltage determined by charging a compensation capacitor during an on time of a secondary current.

6. The switch mode power supply of claim 5, wherein the compensation resistor is coupled in parallel with the compensation capacitor.

7. The switch mode power supply of claim 5, wherein the on time of the secondary current is determined through a low-pass filter.

8. The switch mode power supply of claim 1, wherein the error amplifier comprises a positive terminal coupled to the first terminal and a negative terminal coupled to the reference voltage.

9. The switch mode power supply of claim 1, wherein the secondary current on time detector is separate from the control signal generation circuit.

10. A controller integrated circuit (IC) for a switch mode power supply (SMPS), comprising:
a first terminal for receiving a feedback signal representative of an output voltage of the power supply;
a secondary current on time detector coupled to the first terminal for providing an on time voltage signal during the secondary current on time, the on time voltage signal being a voltage pulse signal having a constant magnitude with a duration representing a duration of the secondary current on time;
a current source coupled to the first terminal, the current source coupled to the secondary current on time detector and configured for providing a compensation current that is proportional to an output current of the power supply, wherein a compensation capacitor is charged during the secondary current on time to provide a voltage signal representing the output current of the power supply;
a control signal generation circuit coupled to the first terminal and having an error amplifier configured for generating a control signal based at least on comparing a voltage at the first terminal with a reference voltage; and
a second terminal for providing the control signal to a power switch to regulate the output voltage of the power supply such that a portion of the output voltage is varied according to a product of the output current and the resistance of a compensation resistor that is external to the controller IC;
wherein the current source is configured for providing the compensation current based on an output of the secondary current on time detector, and not on an output of the error amplifier of the control signal generation circuit.

11. The controller of claim 10, wherein the secondary current on time detector is separate from the control signal generation circuit.

12. The controller of claim 10, wherein the compensation resistor is coupled to the first terminal of the controller.

13. The controller of claim 10, wherein the current source comprises a voltage-controlled current source configured to generate the compensation current based on a voltage determined by charging a compensation capacitor during an on time of a secondary current.

14. The controller of claim 13, wherein the controller further comprises a third terminal (CPC) for coupling to the capacitor.

15. The controller of claim 14, wherein the compensation resistor is coupled to the third terminal of the controller.

16. A method for compensating for voltage drop on a charging cable for charging a battery, the method comprising:
providing a battery charger for connecting to a battery through the charging cable, the charging cable being characterized by a cable resistance, the battery charger including a controller integrated circuit (IC) and an external compensation resistor, the controller IC having:
a first terminal for receiving a feedback signal representative of an output voltage of the power supply;
a secondary current on time detector coupled to the first terminal for providing an on time voltage signal during the secondary current on time, the on time voltage signal being a voltage pulse signal having a constant magnitude with a duration representing a duration of the secondary current on time;
a current source coupled to the first terminal of the controller, the current source coupled to the secondary current on time detector and configured for providing a compensation current that flows from the first terminal, the compensation current being proportional to an output current of the power supply;
a control signal generation circuit coupled to the first terminal and having an error amplifier configured for generating a control signal based at least on comparing a voltage at the first terminal with a reference voltage; and
a second terminal for providing the control signal to a power switch to regulate the output voltage of the power supply such that a portion of the output voltage is proportional to a product of the output current and the resistance of a compensation resistor that is external to the controller IC;
wherein the current source is configured for providing the compensation current based on an output of the secondary current on time detector, and not on an output of the error amplifier of the control signal generation circuit;
wherein the method further comprises determining the resistance of the external compensation resistor based on information regarding the charging cable such that the battery receives a constant charging voltage.

17. The method of claim 16, wherein the battery charger further comprises:
a transformer having a primary winding, a secondary winding, and an auxiliary winding, the primary winding for coupling to an external input voltage, the secondary winding for providing an output voltage to a load;
a voltage divider coupled to the auxiliary winding for providing a feedback signal representative of the output voltage of the power supply, the voltage divider having first and second feedback resistors connected at a feedback node; and a power switch for coupling to the primary winding of the power supply.

18. The method of claim 17, wherein the feedback node is coupled to the first terminal of the controller, and the first feedback resistor is the compensation resistor.

19. The method of claim 16, wherein the error amplifier comprises a positive terminal coupled to the first terminal and a negative terminal coupled to the reference voltage.

20. The method of claim 16, wherein a compensation capacitor is charged during the secondary current on time to provide a voltage signal representing the output current of the power supply.

* * * * *